Nov. 26, 1929.  A. N. CRAMER  1,737,221
GLASS FORMING APPARATUS
Filed Sept. 2, 1926
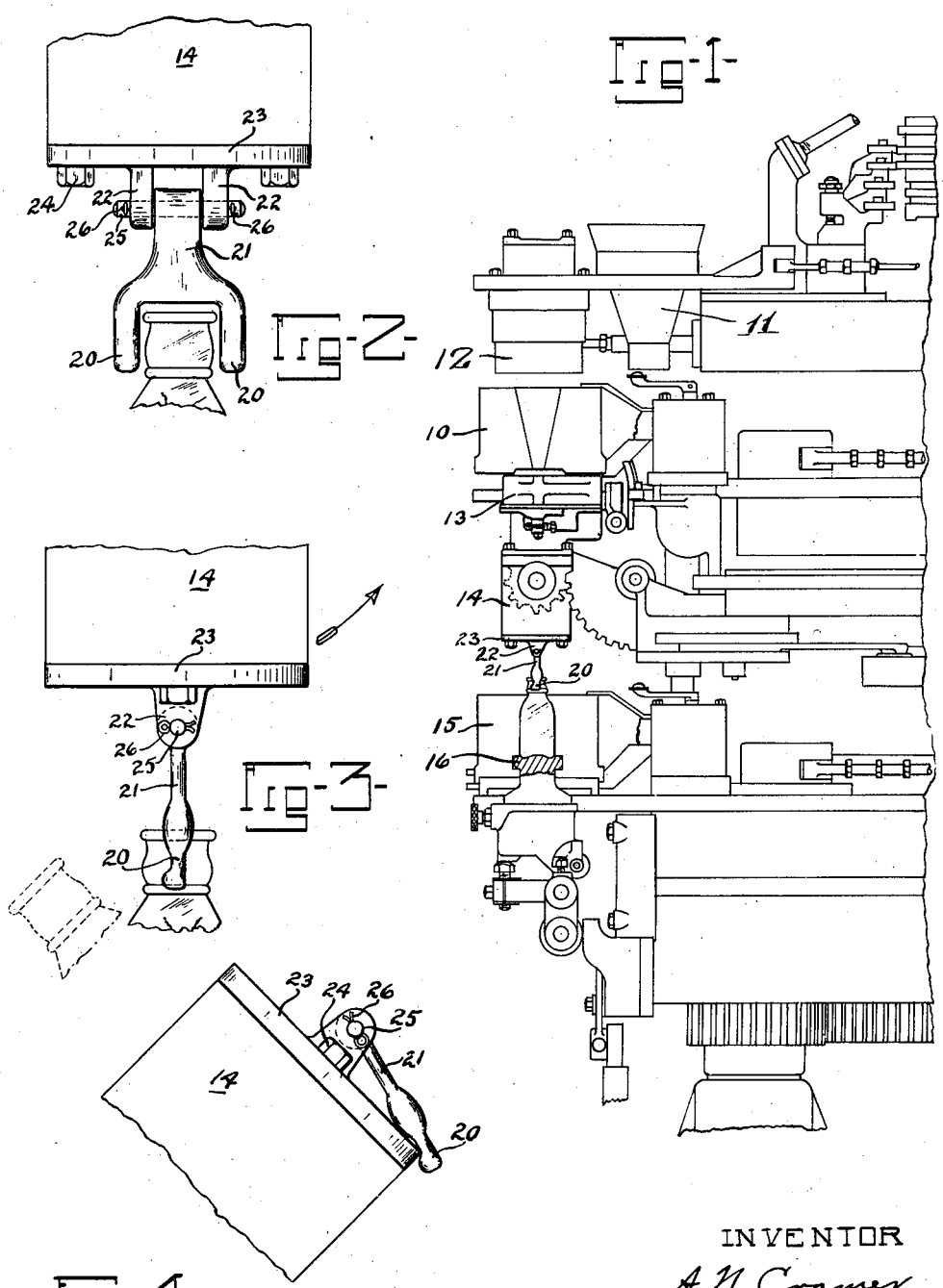
INVENTOR
A. N. Cramer
BY
J. F. Rule,
HIS ATTORNEY Patented Nov. 26, 1929

1,737,221

UNITED STATES PATENT OFFICE

ALBERT N. CRAMER, OF TOLEDO, OHIO, ASSIGNOR TO OWENS-ILLINOIS GLASS COMPANY, OF TOLEDO, OHIO, A CORPORATION OF OHIO

GLASS-FORMING APPARATUS

Application filed September 2, 1926. Serial No. 133,092.

My invention relates to improvements in glass forming apparatus.

An object of the present invention is to provide improved means for use on glassware forming machines comprising sectional finish molds, to prevent the finished ware from being misplaced or carried laterally of the finish mold bottom plate during the separation of the finish mold sections.

It is commonly known that quite frequently because of adhesion of the ware to one of the mold cavities, such ware is drawn laterally away from the finish mold bottom plate, with the result that the ware drops downwardly from between the finish mold sections or is otherwise displaced prior to tilting of the bottom plate. In some instances, because of the above conditions, the ware is only partially supported by the bottom plate at the time the latter is tilted, with the result that the ware does not reach the inclined chute into which the ware is directed under normal conditions.

The present invention provides an improved form of steadying device or holder by which lateral movement of the ware upon the finish mold bottom plate prior to tilting of the latter, and the objectionable consequences are entirely eliminated.

Other objects will be apparent hereinafter.

In the accompanying drawings:

Fig. 1 is a fragmentary diagrammatical illustration of a flow type machine to which my invention is applied;

Fig. 2 is a front elevation of the lower end of a turnover showing my invention applied thereto;

Fig. 3 is a fragmentary side elevation of a turnover mounting my steadying device and showing in dotted lines, the manner in which the bottle or other ware is released from the device; and Fig. 4 is a fragmentary side elevation showing the turnover partly inverted and carrying my steadying device.

My invention is particularly adapted for use upon flow type glass forming machines and accordingly is illustrated in connection with that type of machine, the construction of which is disclosed in my Patent Number 1,693,069, November 27, 1928. This machine comprises a continuously rotating mold carriage including a number of units, each having a blank mold 10 which periodically receives a charge of glass delivered through a funnel guide 11 and compacted in said blank mold by means of pressure applied through a blowhead 12. The lower end of the blank mold periodically registers with a neck mold 13, fixed to a turnover unit 14. Periodically, and immediately following the formation of a parison in the blank mold 10, the blank mold sections open and the turnover is operated to invert the parison and neck mold 13, bringing the parison into a position to be enclosed by the finish mold sections 15. A finish blow is given the parison in the finish mold 15, and just prior to opening of the finish mold sections, the turnover unit returns to the position shown in Fig. 1. The finish molds are then opened and with tilting of the bottom plate 16, the ware is ejected from the machine.

As has been indicated, varying conditions of the mold or the blown article quite frequently cause the bottle or other ware to stick to one of the finish mold sections, with the result that with the separation of the mold sections such ware is drawn to one side of the bottom plate 16. This causes the ware to drop vertically from between the finish mold sections or otherwise displaces the ware, instead of allowing ejections radially into the usual trough from the mold.

In accordance with my invention, a steadying or holding device is attached to the end of the turnover unit, opposite the neck mold 13, and is so arranged that with positioning of the turnover as shown in Fig. 1, the device straddles the neck portion of the bottle or other ware which has just been blown and prevents undesired movement of the ware. The undesired movement is understood to be that at an angle to the direction of ejection.

The device comprises a yoke, including a pair of horizontally spaced fingers 20 integrally formed with a centrally disposed arm 21. This arm has its upper or free end freely pivoted between a pair of depending ears 22, formed upon a carrier plate 23, which in turn is separably attached to the lower end of the turnover unit 14 by bolts 24 or other fastening elements. In pivotally mounting the yoke, a hinge pin 25 is passed through aligned openings in said arm 21 and the depending ears 22, said hinge pin being held against accidental displacement by means of cotter pins 26.

As illustrated in Fig. 1, the steadying device is lowered to an operative position by gravity when the turnover unit assumes a position to bring a blank mold and neck mold into contact and register with each other. At this period, the finish mold sections are about to open. The yoke straddles the neck portion of the bottle or other ware and positively prevents the ware from being misplaced by adhering to a section of the opening mold. Thus, it is evident that with opening of the finish mold and tilting of the bottom plate, the ware is free to move radially from the steadying device and be ejected in the usual manner.

Manifestly, certain changes may be resorted to within the spirit and scope of the appended claims.

What I claim is:

1. Glass forming apparatus including a partible finish mold, a turnover unit above said mold, and means carried by said unit to straddle the neck portion of the ware in the finish mold during opening of the mold.

2. Glass forming apparatus, including a partible finish mold, a turnover unit above said mold, and means on said unit operated by gravity to straddle the neck portion of ware in the finish mold during operation of the mold.

3. Glass forming apparatus, including a partible finish mold, a turnover unit above said mold, and means on said unit for preventing lateral movement of ware in a finish mold during opening of the latter, comprising a device operable by gravity to straddle the neck portion of the ware during the opening period of the mold.

4. Glass forming apparatus, including a partible finish mold, a turnover unit above said mold, a yoke loosely pivoted to one end of said unit, and means causing said yoke to straddle the neck portion of ware during the opening period of the finish mold sections.

5. Glass forming apparatus including a finish mold, a turnover unit above said mold, and a yoke pivoted to one end of the turnover unit and adapted to straddle the neck portion of ware in the finish mold upon complete inversion of the turnover unit.

6. Glass forming apparatus comprising in combination a partible finish mold, a bottom plate, a turnover unit above said mold, and a yoke pivoted to one end of said unit, said yoke being adapted to straddle a neck portion of a bottle prior to and during opening of the finish mold.

7. Glass forming apparatus comprising in combination a partible finish mold, a tiltable bottom plate, a turnover unit above said mold, spaced bearings on one end of said unit, and a device journalled in said bearings and adapted for positioning to prevent movement of ware prior to tilting of the bottom plate.

8. A machine for forming glass articles comprising, in combination, a blank mold, a finish mold, a neck mold, a carrier on which the neck mold is mounted, automatic means to move said carrier and thereby move the neck mold alternately into register with the blank mold and finish mold, respectively, and a device for preventing displacement of the finished article as the finish mold opens, said device being carried by said carrier and moved thereby into operative position when the neck mold is moved into register with the blank mold.

Signed at Toledo, in the county of Lucas and State of Ohio, this 26th day of August, 1926.

ALBERT N. CRAMER.